(12) United States Patent
Thatikonda et al.

(10) Patent No.: US 11,509,746 B2
(45) Date of Patent: Nov. 22, 2022

(54) DISTRIBUTING USER REQUESTS TO CLOUD COMPUTING SYSTEMS ACROSS REGIONS USING A MACHINE LEARNING MODEL

(71) Applicant: salesforce.com, inc., San Francisco, CA (US)

(72) Inventors: Kalyan Chakravarthy Thatikonda, Dublin, CA (US); Sandip Mohod, Sunnyvale, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 17/177,548

(22) Filed: Feb. 17, 2021

(65) Prior Publication Data
US 2022/0263914 A1 Aug. 18, 2022

(51) Int. Cl.
| | |
|---|---|
| *H04L 67/63* | (2022.01) |
| *G06F 16/29* | (2019.01) |
| *G06N 20/00* | (2019.01) |
| *H04L 67/1095* | (2022.01) |
| *G06F 9/50* | (2006.01) |
| *H04L 67/1008* | (2022.01) |
| *H04L 67/52* | (2022.01) |

(52) U.S. Cl.
CPC ............ *H04L 67/63* (2022.05); *G06F 9/5083* (2013.01); *G06F 16/29* (2019.01); *G06N 20/00* (2019.01); *H04L 67/1008* (2013.01); *H04L 67/1095* (2013.01); *H04L 67/52* (2022.05)

(58) Field of Classification Search
CPC .............. H04L 67/327; H04L 67/1008; H04L 67/1095; H04L 67/18; H04L 67/63; H04L 67/52; G06F 9/5083; G06F 16/29; G06N 20/00
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz et al. | |
| 5,649,104 A | 7/1997 | Carleton et al. | |

(Continued)

*Primary Examiner* — Javier O Guzman
(74) *Attorney, Agent, or Firm* — Polygon IP, LLP

(57) ABSTRACT

Systems and methods are described for receiving a user request from a user computing system located in a first geographic region, generating a user request context for the user request, selecting a cloud computing system assigned to a second geographic region having more computing resources currently available to process the user request than a cloud computing system assigned to the first geographic region based at least in part on the user request context and a machine learning model including current utilizations of computing resources of cloud computing systems assigned to the first and second geographic regions, and sending the user request to the selected cloud computing system in the second geographic region. The systems and methods further include getting current utilizations of computing resources from cloud computing systems assigned to a plurality of regions, aggregating user request contexts and the current utilizations of computing resources; and updating the machine learning model with the aggregated user resource contexts and the aggregated current utilizations of computing resources of cloud computing systems.

20 Claims, 10 Drawing Sheets

(56) References Cited

U.S. PATENT DOCUMENTS

| | | |
|---|---|---|
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,289,976 B2 | 10/2007 | Kihneman et al. |
| 7,340,411 B2 | 3/2008 | Cook |
| 7,620,655 B2 | 11/2009 | Larsson et al. |
| 8,271,655 B2 * | 9/2012 | Dawson ................. H04L 67/16 709/226 |
| 10,242,322 B2 * | 3/2019 | Jain ..................... H04L 67/01 |
| 10,277,715 B1 * | 4/2019 | Yan ..................... H04L 67/306 |
| 10,530,632 B1 * | 1/2020 | Mukhopadhyaya ........................ H04L 41/5041 |
| 10,650,928 B1 * | 5/2020 | Larson .................. G16H 50/70 |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachadran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2009/0177744 A1 | 7/2009 | Marlow et al. |
| 2010/0223378 A1 * | 9/2010 | Wei ........ H04L 47/822 709/224 |
| 2011/0138048 A1 * | 6/2011 | Dawson ................. H04L 67/327 709/226 |
| 2012/0173869 A1 * | 7/2012 | Stinson, III ............. H04L 45/02 713/153 |
| 2014/0156566 A1 * | 6/2014 | Kabiljo .................. G06Q 50/01 706/12 |
| 2014/0173130 A1 * | 6/2014 | Uluderya ............. G06F 9/5055 709/238 |
| 2015/0242479 A1 * | 8/2015 | Cheenath ............... G06F 16/273 707/615 |
| 2015/0317357 A1 * | 11/2015 | Harmsen ................ G06N 5/025 707/723 |
| 2015/0379072 A1 * | 12/2015 | Dirac ..................... G06N 20/00 707/693 |
| 2016/0019471 A1 * | 1/2016 | Shin ........................ G10L 15/00 706/12 |
| 2017/0163564 A1 * | 6/2017 | Pogrebinsky ......... G06F 9/5072 |
| 2017/0214632 A1 * | 7/2017 | Ravi .................... H04L 41/0896 |
| 2017/0235788 A1 * | 8/2017 | Borisyuk ............. G06F 16/2272 707/723 |
| 2017/0286864 A1 * | 10/2017 | Fiedel ..................... G06F 9/546 |
| 2018/0089591 A1 * | 3/2018 | Zeiler ....................... G06F 8/65 |
| 2019/0116110 A1 * | 4/2019 | Raney .................... H04L 43/50 |
| 2019/0164070 A1 * | 5/2019 | Gupta ................... G06F 9/5038 |
| 2019/0179944 A1 * | 6/2019 | Ungar ................... H04L 41/142 |

(56) References Cited

U.S. PATENT DOCUMENTS

2020/0366624 A1* 11/2020 Miller .................. H04L 67/327
2021/0174238 A1* 6/2021 Song ........................ G06N 5/04

* cited by examiner

USER REQUEST CONTEXT 308

| 402 | 404 | 406 | 408 | 410 | 412 |
|---|---|---|---|---|---|
| USER ID | USER REQUEST ID | REQUEST VALIDITY | REQUEST TYPE | REQUEST RECEIVED TIME | REQUEST RESPONSE TIME |

FIG. 4

RESOURCE UTILIZATION 316

| 414 | 416 |
|---|---|
| REQUEST RESPONSE TIME | RESOURCE AVAILABILITY |

FIG. 5

AGGREGATED USER REQUEST CONTEXT 317

| 422 | 424 | 426 | 428 | 430 | 432 |
|---|---|---|---|---|---|
| USER ID | REQUEST TYPE | URI | FREQUENCY | RESOURCE UTILIZATION | TIME SLOT |

FIG. 6

REQUEST FORECAST 321

| 1004 | 1006 | 1008 | 1010 | 1012 | 1014 |
|---|---|---|---|---|---|
| USER ID | REQUEST TYPE | URI | FREQUENCY | RESOURCE UTILIZATION | TIME SLOT |

FIG. 10

DISTRIBUTING USER REQUESTS TO CLOUD COMPUTING SYSTEMS ACROSS REGIONS USING A MACHINE LEARNING MODEL

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

TECHNICAL FIELD

One or more implementations relate to load balancing of user requests in cloud computing environments, and more specifically, to distributing user requests to cloud computing systems across regions using a machine learning model.

BACKGROUND

"Cloud computing" services provide shared resources, software, and information to computers and other devices upon request or on demand. Cloud computing typically involves the over-the-Internet provision of dynamically scalable and often virtualized resources. Technological details can be abstracted from end-users, who no longer have need for expertise in, or control over, the technology infrastructure "in the cloud" that supports them. In cloud computing environments, software applications can be accessible over the Internet rather than installed locally on personal or in-house computer systems. Some of the applications or on-demand services provided to end-users can include the ability for a user to create, view, modify, store and share documents and other files.

Cloud computing services are accessed by users from locations all over the world. Data centers providing cloud computing environments supporting such services are often located in disparate geographic locations grouped into regions. A cloud service provider (CSP) operating the data centers seeks to provide a level of service to its users meeting requirements typically defined by service level agreements (SLAs). When demand for cloud computing services fluctuates for certain geographic locations, regions and/or time periods, and changing user activities, it may be difficult to balance available capacity in the overall network of data centers to meet SLA obligations.

BRIEF DESCRIPTION OF THE DRAWINGS

The included drawings are for illustrative purposes and serve to provide examples of possible structures and operations for the disclosed inventive systems, apparatus, methods, and computer-readable storage media. These drawings in no way limit any changes in form and detail that may be made by one skilled in the art without departing from the spirit and scope of the disclosed implementations.

FIG. 4 is a diagram of an example user request context according to some embodiments.

FIG. 5 is a diagram of an example resource utilization according to some embodiments.

FIG. 6 is a diagram of an example aggregated user request context according to some embodiments.

FIG. 10 is a diagram of an example request forecast according to some embodiments.

DETAILED DESCRIPTION

Embodiments of the present invention comprise a method and apparatus for distributing user requests to access cloud computing services across regions using a machine learning (ML) model. The ML model is used to select which cloud computing systems in the regions of the overall cloud computing environment are to receive the user requests based at least in part on validity rules, the context of the user requests, and resource utilizations of the cloud computing systems. The ML model is continually trained based at least in part on the resource utilizations and aggregated user requests contexts to better balance routing of user requests across cloud corn g systems assigned to geographic regions to improve overall cloud computing environment performance.

Figure 1:
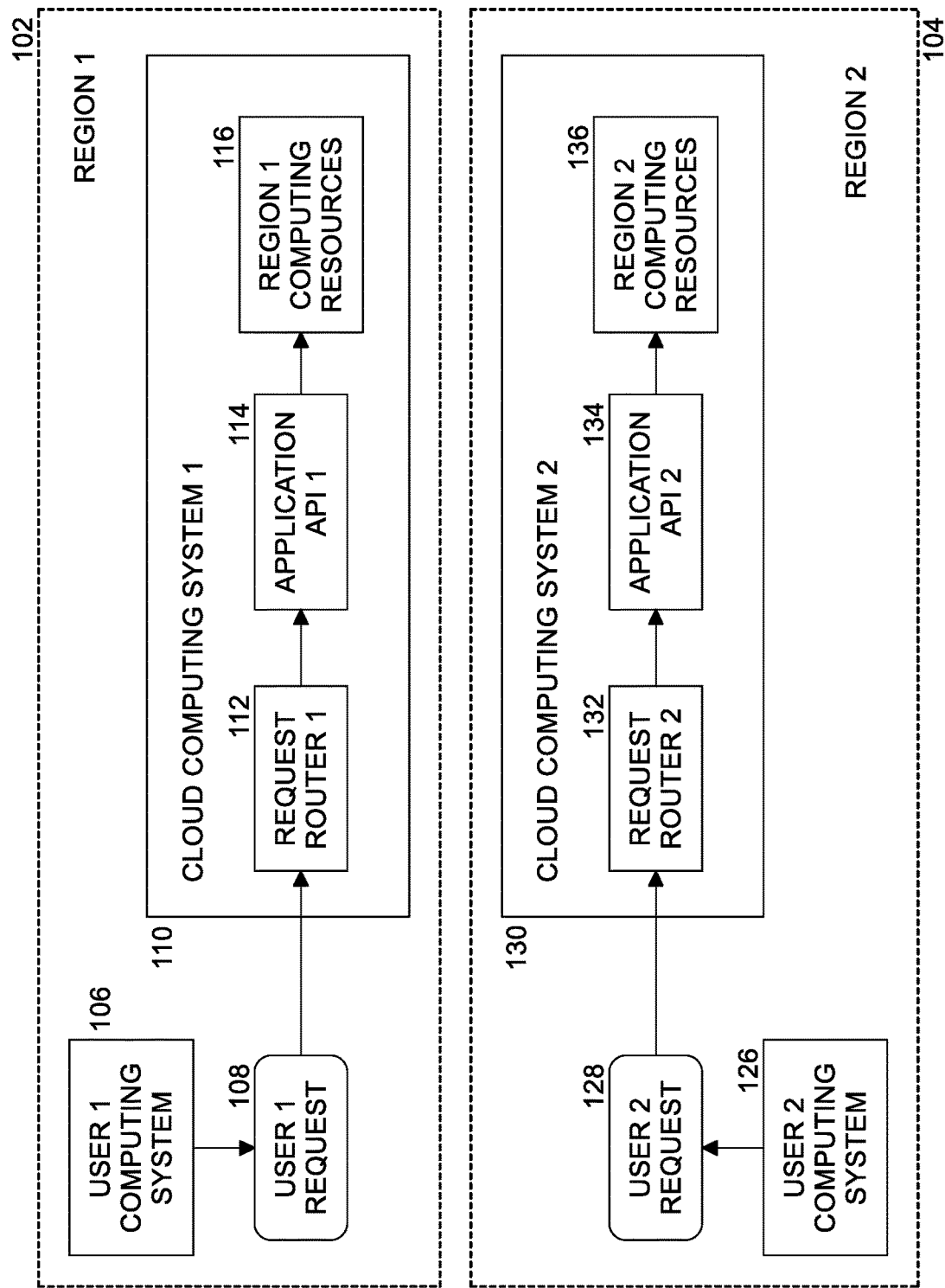
FIG. 1 illustrates a prior art cloud computing environment.

FIG. 1 illustrates a prior art cloud computing environment 100. Cloud computing environment 100 includes a plurality of cloud computing systems, such as cloud computing systems 1 110 and cloud computing system 2 130. Each of the plurality of cloud computing systems includes a plurality of conventional computer servers, storage devices, and network interfaces to run computer applications for users. Users interact with user devices, such as user 1 computing system 106 and user 2 computing system 2 126, to access applications running in cloud computing environment 100 over one or more computer or communications networks (e.g., intranets within organizations or the Internet). Examples of user devices include laptop and desktop personal computers, smart phones, tablet computers, personal digital assistants (PDAs), smart home appliances, home networking equipment, and so on. Cloud computing environment 100 runs a plurality of applications (not shown in FIG. 1), each having an application programming interface (API). In some scenarios, cloud computing environment 100 is operated by a cloud service provider (CSP) and comprises a plurality of production data centers distributed in locations throughout the world.

In some scenarios for cloud computing environment 100, cloud computing systems are grouped into geographic regions where the cloud computing systems are physically located. For example, region 1 102 may represent North America and cloud computing system 1 110 is situated in North America and assigned to region 1 102, and region 2 104 may represent Europe and cloud computing system 2 130 is situated in Europe and assigned to region 2 104. In the simple example of FIG. 1, a first user operating user 1 computing system 106 sends user 1 request 108 to cloud computing system 1 110 in region 1 102, and second user operating user 2 computing system 126 sends user 2 request 128 to cloud computing system 2 130 in region 2 104. A user request represents any request for information or for processing to be performed. Examples of user requests include a request to get a web page, a request to input data, a request to start processing of an application, a request to display information, etc.

In prior art cloud computing environments, user requests are sent to preassigned cloud computing systems in preassigned regions. For example, user 1 request 108 is sent to cloud computing system 1 110 in region 1 102 and user 2 request 128 is sent to computing system 2 130 in region 2 104. When cloud computing system 1 110 receives user 1 request 108, request router 1 112 determines which application programming interface (API), such as application API 1 114, is to be used to process the request and routes user 1 request 108 to region 1 computing resources 116 to be handled. Similarly, cloud computing system 2 130 receives user 2 request 128, request router 2 132 determines which API, such as application API 2 134, is to be used to process the request and routes user 2 request 108 to region 2 computing resources 136 to be handled. A region's computing resources include any number and combination of servers, storage devices, accelerators, load balancers, switches, routers, networks, and so on.

This arrangement typically works well. However, when one region receives more user requests than the cloud computing systems assigned to the region can efficiently handle, region throughput and overall system performance may be degraded. This may occur even when one or more other regions have excess capacity. Since the user computing systems and resulting user requests are preassigned to certain cloud computing systems and associated regions, excess capacity in other regions cannot be deployed dynamically and temporarily to help with the overload conditions.

For example, suppose region 1 represents Europe and the number of user requests is large during business hours in Europe, such as 8 am to 6 pm Greenwich Mean Time (GMT), and region 2 represents East Asia and during this same time the number of user requests is relatively low (because business hours in East Asia are not currently in effect). In typical prior art cloud computing environments, the temporary excess capacity in the East Asia region is wasted and cannot be redirected to help with the current degradation in performance of the European region.

Figure 2:
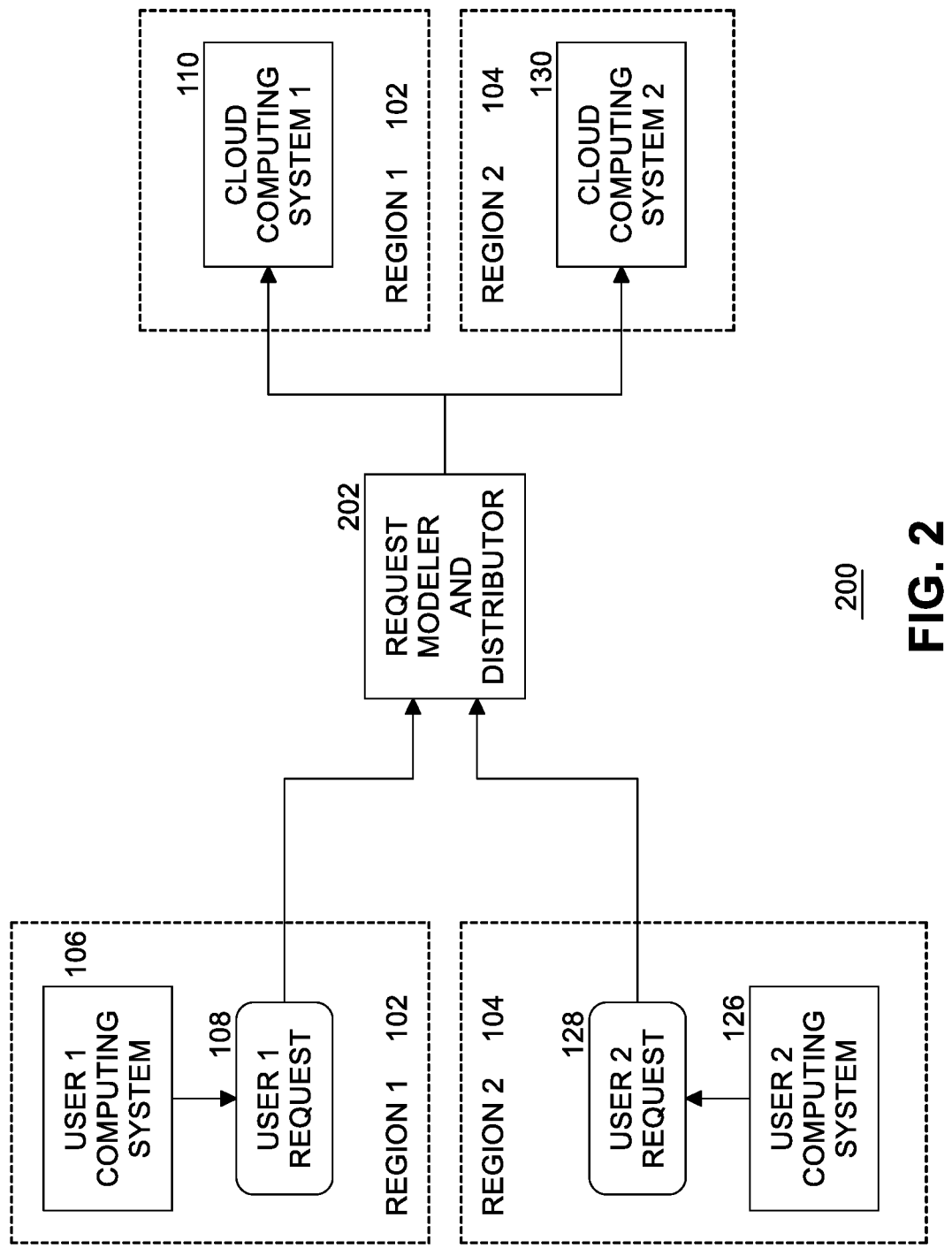
FIG. 2 illustrates a cloud computing environment according to some embodiments.

FIG. 2 illustrates a cloud computing environment 200 according to some embodiments. As in FIG. 1, users send user requests to the cloud computing environment. For example, user 1 request 108 is sent by user 1 computing system 106 in region 1 102 and user 2 request 128 is sent by user 2 computing system 126 in region 2 104. In embodiments, request modeler and distributor 202 receives a user request, determines which region and which cloud computing system within a region is to receive the user request, and forwards the user request to the selected cloud computing system. In some cases, request modeler and distributor 202 sends the user request to the region where the user computing system is located. For example, request modeler and distributor 202 may receive user 1 request 108 from user 1 computing system 106 in region 1 102 and determine that user 1 request 108 is to be sent to cloud computing system 1 110, also in region 1 102. In other cases, request modeler and distributor 202 sends the user request to a region where the user computing system is not located to improve the performance in handling the user request. For example, request modeler and distributor 202 may receive user 2 request 128 from user 2 computing system 126 in region 2 104 and determine that user 2 request 128 is to be sent to cloud computing system 1 110 in region 1 102, instead of cloud computing system 2 130 in region 2 104. For clarity, details of the cloud computing systems (e.g., request routers, application APIs, and computing resources) have been omitted from FIG. 2.

In some embodiments, the number of applications, the number of cloud computing systems, and the number of users may all be very large—perhaps millions or even tens of millions of instances of applications being accessed by millions, tens, or hundreds of millions of users worldwide in a distributed cloud computing environment 200 having thousands, tens of thousands, or hundreds of thousands of cloud computing systems. There may be any number of regions in cloud computing environment 200, and any number of cloud computing systems in any region and overall.

In an embodiment, application APIs (e.g., API 1 114, API 2 134) comprise representational state transfer (REST) APIs. REST is a de-facto standard for a software architecture for interactive applications that typically use multiple web services. In order to be used in a REST-based application, a web service needs to meet certain constraints (such a web service is called RESTful). A RESTful web service is required to provide an application access to its web resources in a textual representation and support reading and modification of them with a stateless protocol and a predefined set of operations. By being RESTful, web services provide interoperability between the computer systems on the Internet that provide these services. In an embodiment, an application running in a cloud computing system interface by application API 1 114 or application API 2 134 is a configure price quote (CPQ) application. In other embodiments, any other REST-based applications may be used.

Embodiments automatically and efficiently route user requests to cloud computing systems in any region such that the overall performance of the cloud computing environment is improved over prior art cloud computing environments rigidly pre-assigning user requests to regions co-located with users.

Figure 3:
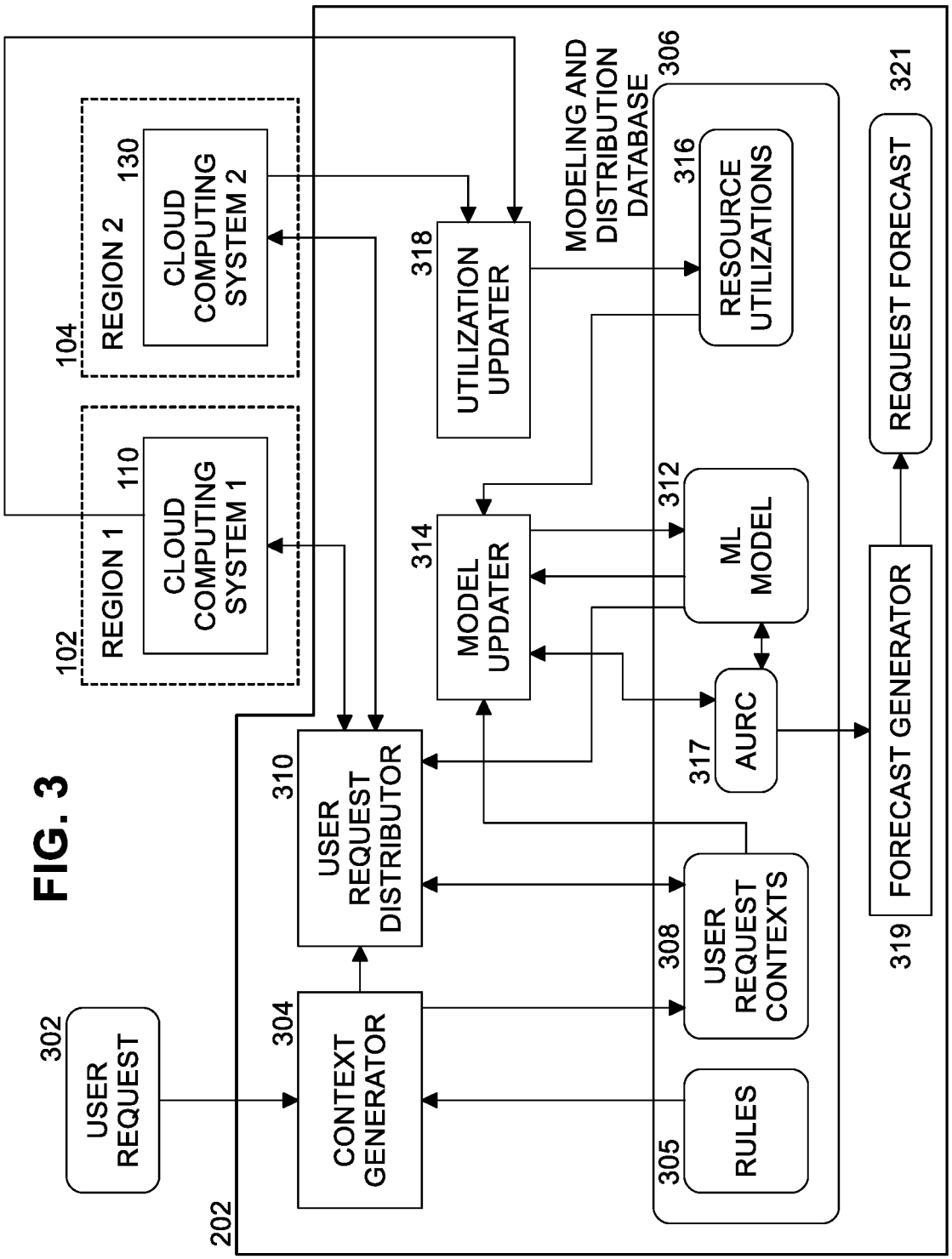
FIG. 3 is a diagram of a request modeler and distributor according to some embodiments.

FIG. 3 is a diagram of request modeler and distributor 202 according to some embodiments. User request 302 is received by context generator 304 of request modeler and distributor 202. Context generator 304 assigns an identifier (ID) to the user request, validates the user request according to a plurality of validity rules 305 stored in modeling and distribution database 306, and generates a user request context 308 for the user request and stores the user request context in modeling and distribution database 306.

FIG. 4 is a diagram of an example user request context 308 according to some embodiments. User ID 402 is a unique identifier assigned to a user (also known as a tenant) who originated the user request. User request ID 404 is a unique identifier assigned to the user request. Request validity 406 is a binary flag indicating whether the user request meets the validity rules 305. Request type 408 indicates a type of user request. In an embodiment, request types include synchronous, asynchronous, and bulk (e.g., multiple user requests in a batch). Request received time 410 is the time that request modeler and distributor 202 received user request 302. Request response time 412 is the time that request modeler and distributor 202 received notification that the user request has been completed. The fields of user ID 402, user request ID 404, request accuracy 406, request type 408, and request received time 410 are populated by context generator 304 at the time of initial processing of user request 302. The field request response time 412 is populated after the user request is processed by a cloud computing system in a region and notification of the user request processing being completed is received.

Table 1 shows an example of a plurality of user request contexts 308.

TABLE 1

| USER ID | USER REQUEST ID | REQUEST TYPE | REQUEST RECEIVED TIME | REQUEST RESPONSE TIME |
|---|---|---|---|---|
| 1 | 1 | SYNC | 2021:02:1008:15:03 | 2021:02:1008:15:12 |
| 1 | 2 | ASYNC | 2021:02:10 08:15:06 | 2021:02:10 08:16:21 |
| 3 | 3 | ASYNC | 2021:02:1008:15:23 | 2021:02:1008:15:59 |
| 1 | 4 | SYNC | 2021:02:10 08:15:25 | 2021:02:10 08:16:02 |
| 2 | 5 | BULK | 2021:02:10 08:15:26 | 2021:02:10 08:15:30 |
| 4 | 6 | BULK | 2021:02:10 08:15:27 | 2021:02:10 08:16:05 |
| 3 | 7 | SYNC | 2021:02:10 08:15:27 | 2021:02:10 08:15:39 |

In an embodiment, validity rules 305 are defined specifically for an application. In another embodiment, validity rules 305 are defined specific to request type 408. Validity rules may be defined and/or updated by a system administrator of cloud computing environment 200 and stored in modeling and distribution database 306 at any time. In an embodiment, validity rules 305 are created and/or automatically updated based at least in part on data model patterns (including patterns resulting from analysis of request types, user IDs, request frequency, etc.) detected from processing of user requests. In some embodiments, the validity rules verify the values in one or more header fields included in the user request to determine the validity of the request received. Examples of such headers include user organization ID (Org ID), refresh token, access token, and version.

User request distributor 310 uses user request 302 and user request context 308 (for user request 302) to make a distribution decision for which cloud computing system to send the user request to be processed based at least in part on ML model 312. User request distributor 310 estimates processing time at a cloud computing system for each user request 302 and estimates the availability of computing resources at the cloud computing system for processing future user requests. User request distributor 310 determines the number of user requests that can be processed for all request types by all users across all regions along with considerations of limits on computing resources for specific users and specific request types (e.g., synchronous, asynchronous, and bulk).

In some embodiments, ML model 312 is generated based on the raw data that is collected as part of user requests 302 received by request modeler and distributor 202. Once the user request is received, a unique user ID is generated for each request. The request is parsed to extract the user request context 308 and the extracted user context is validated against the request validity rules 305. This user request context is now stored as raw user request context data 308 in the modeling and distribution database 306. As part of ML model 312, this raw user request context data and the user requests are aggregated into aggregated user request contexts (AURC) 317 based at least in part on the unique user ID, request type, and uniform resource identifier (URI). The frequency of the user requests can be calculated from the aggregated data (e.g., AURC 317). If the user request context data 308 for a given user and request type is already present in the aggregated user request context data 317, the frequency of the corresponding aggregated user request context will be increased by 1. If not, the frequency for aggregated user request context for that request is set to 1.

In an embodiment, a ML model is created for each type of user request (synchronous, asynchronous, and bulk).

Once user request 302 is forwarded by user request distributor 310 to a selected cloud computing system in a selected region (such as, cloud computing system 1 110 in region 102 or cloud computing system 2 130 in region 2 104), the selected cloud computing system processes the user request and sends a notification of completion back to user request distributor 310. User request distributor 310 then updates user request context 308 in modeling and distribution database 306. At some time after processing the user request, the selected cloud computing system also sends resource utilization information to utilization updater 318. In an embodiment, resource utilization information includes maximum load, average load, maximum memory usage, average memory usage, throughput rate, and remaining capacity. Utilization updater 318 stores at least a portion of this resource utilization information as resource utilizations 316 in modeling and distribution database 306. In an embodiment, reporting of the resource utilization information for processing of user requests is performed according to a periodic schedule (e.g., every ten minutes, every twenty minutes, hourly, daily, etc.). In another embodiment, reporting of the resource utilization information for processing of user requests is performed after a selected number of user requests have been performed by cloud computing environment 200, by a selected region, or by a selected computing system. Other frequencies and rules for determining when to report resource utilization information may be used.

FIG. 5 is a diagram of an example resource utilization 316 according to some embodiments. Resource utilization 316 includes request response time 414 of the time processing of the user request was completed. Resource utilization 316 also include resource availability 416, which describes the availability of computing resources at the time of the request response time 414 on a cloud computing system.

Turning back to FIG. 3, model updater 314 updates ML model 312 based at least in part on resource utilizations 316 and user request contexts 308. As part of model updating, model updater 314 generates an aggregated user request context (AURC) 420 from a plurality of user request contexts 308 and stores the aggregated user request context 420 in modeling and distribution database 306.

FIG. 6 is a diagram of an example aggregated user request context 317 according to some embodiments. User ID 422 is a unique identifier assigned to a user (also known as a tenant) who originated the user request. Request type 424 is the type of user request (e.g., synchronous, asynchronous, or bulk). URI 426 is a universal resource identifier (URI) for the user request. Frequency 428 is a number of user requests per unit time. Resource utilization 430 is the aggregated resource utilization 316 (including request response time 414 and resource availability 416) provided by cloud computing systems in all regions. Time slot 432 defines a time span during which the user requests were processed (e.g., from 1 pm to 2 pm GMT, etc.).

TABLE 2 shows an example of aggregated user request context 420.

| USER ID | USER REQUEST TYPE | URI | FREQ-UENCY | RESOURCE UTILIZATION | TIME SLOT |
|---|---|---|---|---|---|
| 1 | SYNC | /api/user1/sync | 2 | CLOUD COMPUTING SYSTEM 1 DATA | 01 to 02 |

TABLE 2-continued shows an example of aggregated user request context 420.

| USER ID | USER REQUEST TYPE | URI | FREQUENCY | RESOURCE UTILIZATION | TIME SLOT |
|---|---|---|---|---|---|
| 1 | ASYNC | /api/user1/async | 1 | CLOUD COMPUTING SYSTEM 1 DATA | 02 to 03 |
| 1 | BULK | /api/user1/bulk | 2 | CLOUD COMPUTING SYSTEM 1 DATA | 03 to 04 |
| 2 | BULK | /api/user2/bulk | 1 | CLOUD COMPUTING SYSTEM 1 DATA | 04 to 05 |
| 2 | SYNC | /api/user2/sync | 1 | CLOUD COMPUTING SYSTEM 1 DATA | 05 to 06 |
| 3 | ASYNC | /api/user3/async | 1 | CLOUD COMPUTING SYSTEM 1 DATA | 06 to 07 |
| 4 | ASYNC | /api/user4/async | 1 | CLOUD COMPUTING SYSTEM 1 DATA | 07 to 08 |

Sample pseudo code to extract the raw user request context data 308 and create aggregated user request context data 420 for creating ML model 312 is shown below.

```
UserRequest userRequest;
RawUserRequestContext
rawUserRequestContext=extractAndStoreRawUserRequest
Context (UserRequest userRequest);
generateAggregatedUserRequestContextDataModelFor
(RawUserRequestContext rawUserRequestContext);
public RawUserRequestContext extractAndStoreRawUser-
RequestContext (UserRequest userRequest){
    RawUserRequestContext userContext={requestId: null,
    requestAccuracy: false,
    requestType: null,
    requestReceivedTime: now( )
    requestResponseTime: null}
    RawUserRequestContext rawUserRequestContext;
    rawUserRequestContext.requestId=UUID.getId( ); //generate unique request id
    rawUserRequestContext.requestAccuracy=validateRequest
Accuracy(userRequest.headers);
    rawUserRequestContext.requestType=userRequest.
headers.requestType;
    insert rawUserRequestContext into RawUserRequest-
ContextDataStore;
    return rawUserRequestContext;}
public boolean validateRequestAccuracy(Headers request-
Headers){
    ValidationRule rules={requestType: ['sync', 'async', 'bulk'],
    version: "1-15"}; //rules are set by application owner
    for (Rule rule: rules){//loop thru each rule to validate
headers boolean result=applyRule(rule, requestHeaders);
        if (!result) return result;}
    return true; //request is accurate}
public void generateAggregatedUserRequestContextData-
ModelFor (RawUserRequestContext rawUserRequestContext){
    Timeslot currentTimeSlot=getCurrentTimeSlot( );
    boolean timeslotExists=select 1 from "Aggregated User
Request Context Data Model"
    where        "timeslot"=currentTimeSlot        and
        user=rawUserRequestContext.userid
        and
            requestType=rawUserRequestContext.requestType;
    if (timeslotExists){
    update "Aggregated User Request Context Data Model"
    set frequency=frequency+1
    where user=rawUserRequestContext.userid
    and requestType=rawUserRequestContext.requestType;
    }else{
    insert into "Aggregated User Request Context Data
        Model"
    (rawUserRequestContext.userId,   rawUserRequestContext.requestType,
        rawUserRequestContext.URI, 1, currentTimeSlot)}
}
```

Figure 7:
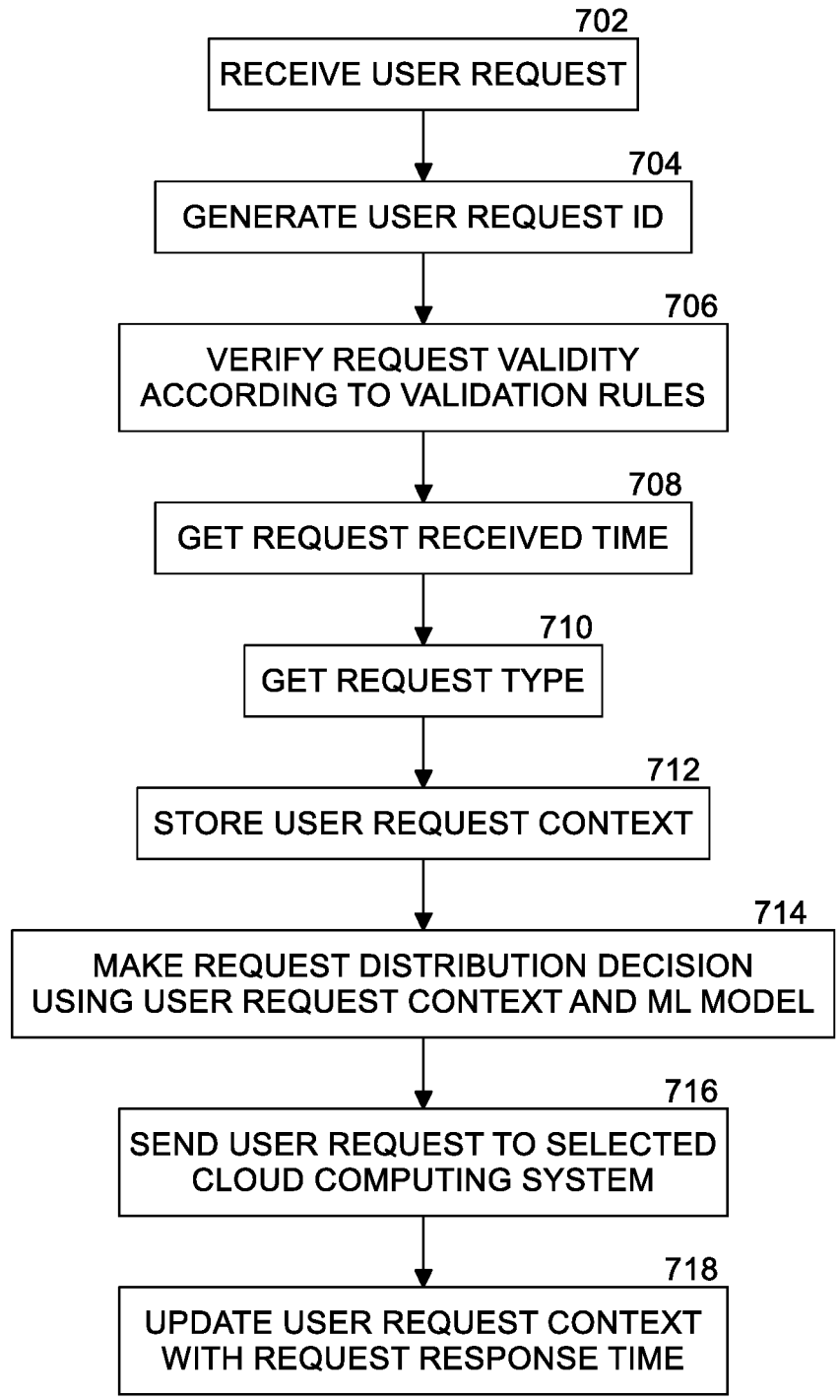
FIG. 7 is a flow diagram of request modeler and distribution processing according to some embodiments.

FIG. 7 is a flow diagram of request modeler and distribution 202 processing 700 according to some embodiments. At block 702, context generator 304 receives user request 302. At block 704, context generator 304 generates a unique user request ID 404 for user request 302. At block 706, context generator 304 verifies the request validity of user request 302 according to validation rules 305. If the request accuracy does not pass, processing of the user request is halted. If the request accuracy does pass, at block 708, context generator 304 gets request received time 410 of user request 302. At block 710, context generator 304 gets request type 408 of the user request 302. At block 712, context generator 304 generates a user request context 308 for the user request 302 and stores the user request context in modeling and distribution database 306. At block 714, user request distributor 310 makes a request distribution decision using user request 302, user request context 308 and ML model 312. At block 716, user request distributor 310 sends user request 302 to the cloud computing system selected by ML model 312, and at a later time receives a notification that the user request has been processed by the selected cloud computing system. At block 718, user request distributor 310 updates the user request context 308 for user request 302 with request response time 412.

Figure 8:
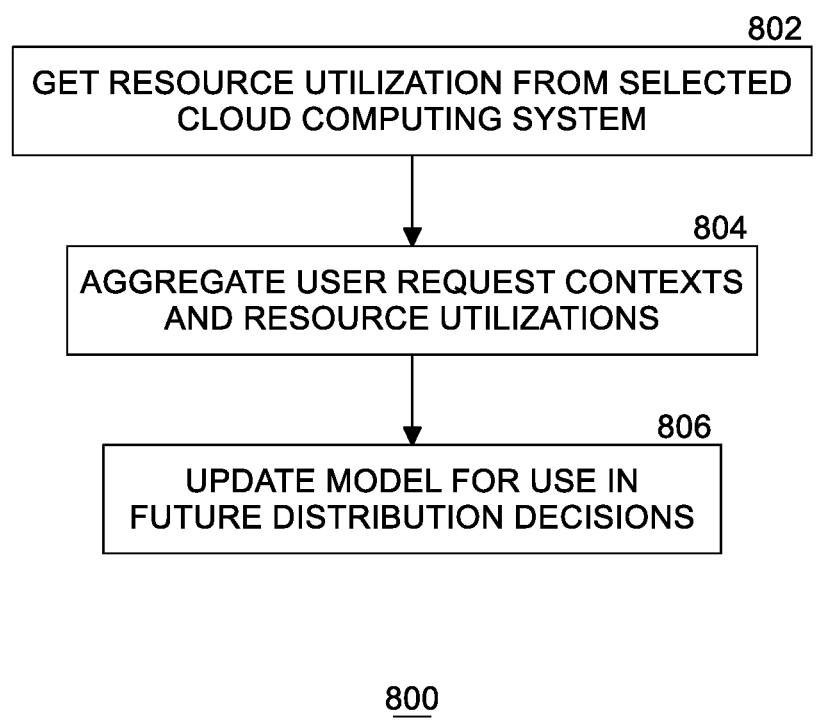
FIG. 8 is a flow diagram of machine learning model update processing according to some embodiments.

FIG. 8 is a flow diagram of machine learning model 312 update processing 800 according to some embodiments. At block 802, utilization updater 318 gets resource utilization 316 from a selected cloud computing system. In an embodiment, one or more resource utilization data items is obtained from one or more cloud computing systems. At block 803, model updater 314 aggregates user request contexts 308 and resource utilizations 316 into aggregated user request context 317. Aggregated user request context 317 is stored in modeling and distribution database 306. At block 806, model updater 314 updates ML model 312 using resource utilizations 316 and AURC 317 for use in future distribution decisions for user requests.

Sample pseudo code to update ML model 312 is shown below.

© 2021 salesforce, inc.

```
@Scheduler//this function invoked periodically to fetch
resource utilizations
```

```
public void fetchAndUpdateResourceUtilization(Regis-
teredCloudProviders[ ]
    registeredCloudProviders){
    ResourceUtilization[ ] resourceUtilization;
    for (RegisteredCloudProvider registeredCloudProvider:
registeredCloudProviders){
        for (Resource resource: registeredCloudProvider.getAll-
Resources( )){
            resourceUtilization.add(resource.getResource
Utilization( );}
    }
    insert into "Resource Utilization" (request response time,
resource availability)
        (now( ) resourceUtilization from dual;
    }
    @Scheduler//this function is invoked once the current
time slot is finished
    public void UpdateAggregateResourceUtilizationPer-
TimeSlot( ){
        ResourceUtilization[ ] resourceUtilization=get resource
utilization from "Resource
            Utilization" data store for given timeslot;
        update "Aggregated User Request Context Data Model"
        set "Resource Utilization"=resourceUtilization
        where "timeslot"=previousTimeSlot;
    }
```

Figure 9:
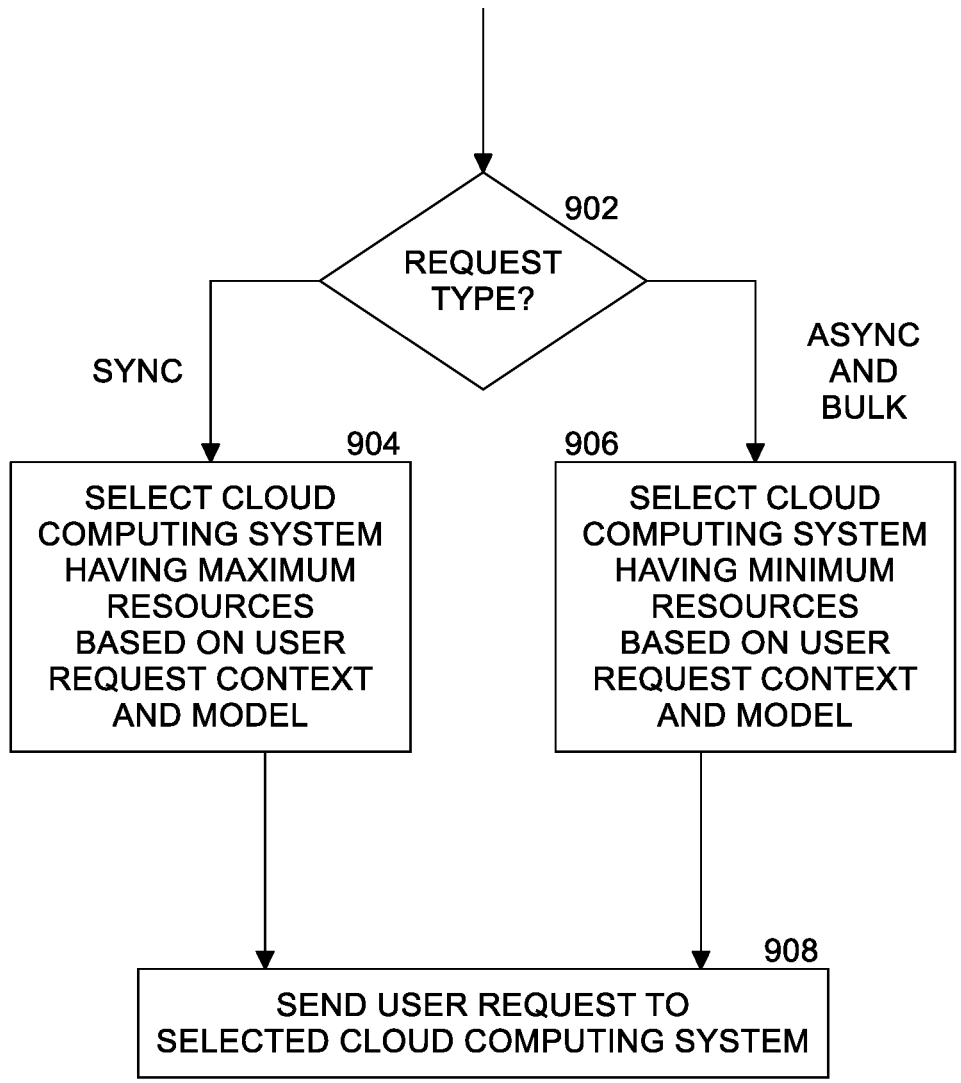
FIG. 9 is a flow diagram of request distribution decision processing according to some embodiments.

FIG. 9 is a flow diagram of request distribution decision processing 900 according to some embodiments. The actions of FIG. 9 are representative of block 714 of FIG. 7 in one embodiment. At block 902, user request distributer 310 determines the request type of the current user request 302 from user request context 308. If the request type is synchronous, then user request distributor 310 selects a cloud computing system having a maximum amount of available computing resources to receive the user request based at least in part on user request context 308 and ML model 312. If the request type is asynchronous or bulk, then user request distributor 310 selects a cloud computing system having a minimum amount of available computing resources to receive the user request based at least in part on user request context 308 and ML model 312. In an embodiment, all available cloud computing system resources are captured based on the total number of regions and represented as resource utilizations 316. Minimum and maximum resource values are determined by comparing available resources from all cloud computing systems represented in the aggregated user request context 420.

Returning to FIG. 3, forecast generator 319 uses aggregated user request context data 317 as input to evaluate the total computing resources consumed for a specific user request. Forecast generator 319 generates request forecast 321. Outliers in the aggregated user request context 317 are removed before updating the data in a forecast model in forecast generator 319. For example, if a random spike of user requests for a specific user on a specific day over a defined period of time occurs, these user requests may be considered as outliers and removed from forecast generation processing. In addition, if errors or anomalies in the user request contexts are detected, error signals may be communicated to system administrators and/or users. Forecast generator 319 helps application owners to forecast the needed computing resources and costs based on the usage per user request context 308. In an embodiment, forecast generator 319 can be extended to create and display UI dashboards of forecasted computing resources needed for anticipated user requests for specific application needs.

FIG. 10 is a diagram of an example request forecast 321 according to some embodiments. User ID 422 is a unique identifier assigned to a user (also known as a tenant) who originated the user request. Request type 424 is the type of user request (e.g., synchronous, asynchronous, or bulk). URI 426 is a universal resource identifier (URI) for the user request. Frequency 428 is a number of user requests per unit time. Resource utilization 430 is the aggregated resource utilization 316 (including time stamp 424 and resource availability 416) provided by cloud computing systems in all regions. Time slot 432 defines a time span during which the user requests were processed (e.g., from 1 μm to 2 pm GMT, etc.).

Embodiments provide a deterministic approach in the context of user requests to route user requests to selected cloud computing systems in regions using a ML model. Embodiments provide visibility around the data patterns of using computing resources and the historic request flow in the context of user requests to develop a mapping of user requests to appropriate computing resources.

Embodiments maintain current states of computing resources in cloud computing systems to ensure the efficient processing of user requests. Embodiments dynamically generate forecasts in terms of the context of user requests and estimate the accurate resources (e.g., memories, processors, network bandwidth, etc.) for a user request to be processed, resulting in lessening overload costs for user requests while efficiently processing user requests. Embodiments persist the user request contexts for use in forecasting the request trends for a given API service. Finally, embodiments forecast or generate warnings for anomalous patterns detected in the user request contexts.

Example Electronic Devices and Environments. One or more parts of the above implementations may include software. Software is a general term whose meaning can range from part of the code and/or metadata of a single computer program to the entirety of multiple programs. A computer program (also referred to as a program) comprises code and optionally data. Code (sometimes referred to as computer program code or program code) comprises software instructions (also referred to as instructions). Instructions may be executed by hardware to perform operations. Executing software includes executing code, which includes executing instructions. The execution of a program to perform a task involves executing some or all the instructions in that program.

An electronic device (also referred to as a device, computing device, computer, computer server, cloud computing server, etc.) includes hardware and software. For example, an electronic device may include a set of one or more processors coupled to one or more machine-readable storage media (e.g., non-volatile memory such as magnetic disks, optical disks, read only memory (ROM), Flash memory, phase change memory, solid state drives (SSDs)) to store code and optionally data. For instance, an electronic device may include non-volatile memory (with slower read/write times) and volatile memory (e.g., dynamic random-access memory (DRAM), static random-access memory (SRAM)). Non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device has power removed, and that has sufficiently fast read/write times such that, rather than copying the part of the code to be executed into volatile memory, the code/data may be provided directly to the set of processors (e.g., loaded into a cache of the set of processors). In other words, this non-volatile memory operates as both long term storage and main memory, and thus the electronic device may have no or only a small amount of volatile memory for main memory.

In addition to storing code and/or data on machine-readable storage media, typical electronic devices can transmit and/or receive code and/or data over one or more machine-readable transmission media (also called a carrier) (e.g., electrical, optical, radio, acoustical or other forms of propagated signals—such as carrier waves, and/or infrared signals). For instance, typical electronic devices also include a set of one or more physical network interface(s) to establish network connections (to transmit and/or receive code and/or data using propagated signals) with other electronic devices. Thus, an electronic device may store and transmit (internally and/or with other electronic devices over a network) code and/or data with one or more machine-readable media (also referred to as computer-readable media).

Software instructions (also referred to as instructions) are capable of causing (also referred to as operable to cause and configurable to cause) a set of processors to perform operations when the instructions are executed by the set of processors. The phrase "capable of causing" (and synonyms mentioned above) includes various scenarios (or combinations thereof), such as instructions that are always executed versus instructions that may be executed. For example, instructions may be executed: 1) only in certain situations when the larger program is executed (e.g., a condition is fulfilled in the larger program; an event occurs such as a software or hardware interrupt, user input (e.g., a keystroke, a mouse-click, a voice command); a message is published, etc.); or 2) when the instructions are called by another program or part thereof (whether or not executed in the same or a different process, thread, lightweight thread, etc.). These scenarios may or may not require that a larger program, of which the instructions are a part, be currently configured to use those instructions (e.g., may or may not require that a user enables a feature, the feature or instructions be unlocked or enabled, the larger program is configured using data and the program's inherent functionality, etc.). As shown by these exemplary scenarios, "capable of causing" (and synonyms mentioned above) does not require "causing" but the mere capability to cause. While the term "instructions" may be used to refer to the instructions that when executed cause the performance of the operations described herein, the term may or may not also refer to other instructions that a program may include. Thus, instructions, code, program, and software are capable of causing operations when executed, whether the operations are always performed or sometimes performed (e.g., in the scenarios described previously). The phrase "the instructions when executed" refers to at least the instructions that when executed cause the performance of the operations described herein but may or may not refer to the execution of the other instructions.

Electronic devices are designed for and/or used for a variety of purposes, and different terms may reflect those purposes (e.g., user devices, network devices). Some user devices are designed to mainly be operated as servers (sometimes referred to as server devices), while others are designed to mainly be operated as clients (sometimes referred to as client devices, client computing devices, client computers, or end user devices; examples of which include desktops, workstations, laptops, personal digital assistants, smartphones, wearables, augmented reality (AR) devices, virtual reality (VR) devices, mixed reality (MR) devices, etc.). The software executed to operate a user device (typically a server device) as a server may be referred to as server software or server code), while the software executed to operate a user device (typically a client device) as a client may be referred to as client software or client code. A server provides one or more services (also referred to as serves) to one or more clients.

The term "user" refers to an entity (e.g., an individual person) that uses an electronic device. Software and/or services may use credentials to distinguish different accounts associated with the same and/or different users. Users can have one or more roles, such as administrator, programmer/developer, and end user roles. As an administrator, a user typically uses electronic devices to administer them for other users, and thus an administrator often works directly and/or indirectly with server devices and client devices.

Figure 11:
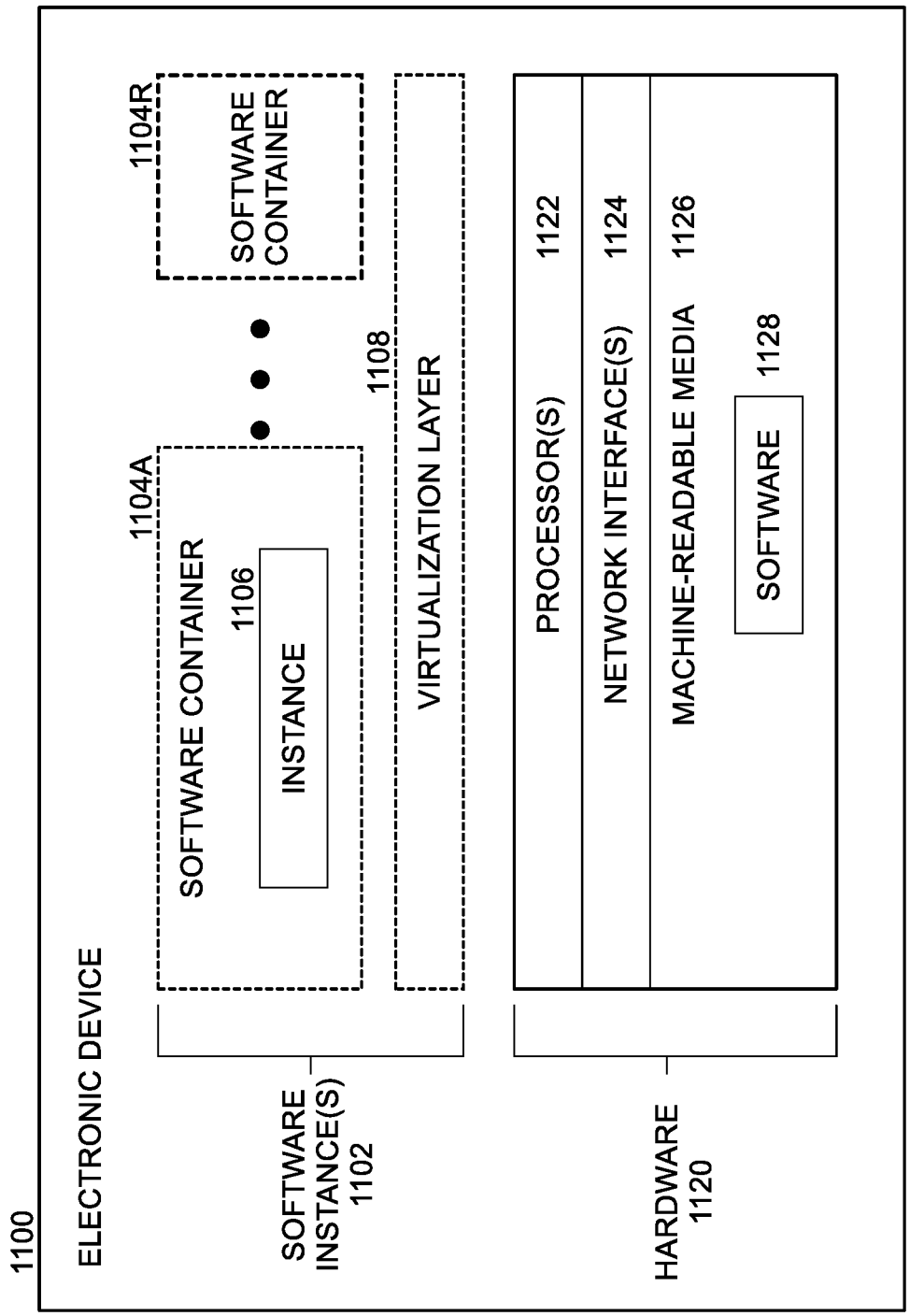
FIG. 11 is a block diagram illustrating an electronic device according to some example implementations.

FIG. 11 is a block diagram illustrating an electronic device 1100 according to some example implementations. FIG. 11 includes hardware 1120 comprising a set of one or more processor(s) 1122, a set of one or more network interfaces 1124 (wireless and/or wired), and machine-readable media 1126 having stored therein software 1128 (which includes instructions executable by the set of one or more processor(s) 1122). The machine-readable media 1126 may include non-transitory and/or transitory machine-readable media. Each of the previously described user computing systems and request modeler and distributor system 202 may be implemented in one or more electronic devices 1100. In one implementation: 1) each of the clients/users is implemented in a separate one of the electronic devices 1100 (e.g., in end user devices where the software 1128 represents the software to implement clients/users to interface directly and/or indirectly with the request modeler and distributor system 202 (e.g., software 1128 represents a web browser, a native client, a portal, a command-line interface, and/or an application programming interface (API) based upon protocols such as Simple Object Access Protocol (SOAP), Representational State Transfer (REST), etc.)); 2) the request modeler and distributor system 202 is implemented in a separate set of one or more of the electronic devices 1100 (e.g., a set of one or more server devices where the software 1128 represents the software to implement the request modeler and distributor system 202); and 3) in operation, the electronic devices implementing the clients/users and the request modeler and distributor system 202 would be communicatively coupled (e.g., by a network) and would establish between them (or through one or more other layers and/or or other services) connections for submitting user requests 302 to request modeler and distributor system 202. Other configurations of electronic devices may be used in other implementations (e.g., request modeler and distributor system 202 and cloud computing systems are implemented on a single one of electronic device 1100).

During operation, an instance of the software 1128 (illustrated as instance 1106 and referred to as a software instance; and in the more specific case of an application, as an application instance) is executed. In electronic devices that use compute virtualization, the set of one or more processor(s) 1122 typically execute software to instantiate a virtualization layer 1108 and one or more software container(s) 1104A-1104R (e.g., with operating system-level virtualization, the virtualization layer 1108 may represent a container engine (such as Docker Engine by Docker, Inc. or rkt in Container Linux by Red Hat, Inc.) running on top of (or integrated into) an operating system, and it allows for the creation of multiple software containers 1104A-1104R (representing separate user space instances and also called virtualization engines, virtual private servers, or jails) that may each be used to execute a set of one or more applications; with full virtualization, the virtualization layer 1108 represents a hypervisor (sometimes referred to as a virtual machine monitor (VMM)) or a hypervisor executing on top of a host operating system, and the software containers 1104A-1104R each represent a tightly isolated form of a software container called a virtual machine that is run by the hypervisor and may include a guest operating system; with para-virtualization, an operating system and/or application running with a virtual machine may be aware of the presence of virtualization for optimization purposes). Again, in electronic devices where compute virtualization is used, during operation, an instance of the software 1128 is executed within the software container 1104A on the virtualization layer 1108. In electronic devices where compute virtualization is not used, the instance 1106 on top of a host operating system is executed on the "bare metal" electronic device 1100. The instantiation of the instance 1106, as well as the virtualization layer 1108 and software containers 1104A-1104R if implemented, are collectively referred to as software instance(s) 1102.

Alternative implementations of an electronic device may have numerous variations from that described above. For example, customized hardware and/or accelerators might also be used in an electronic device.

Figure 12:
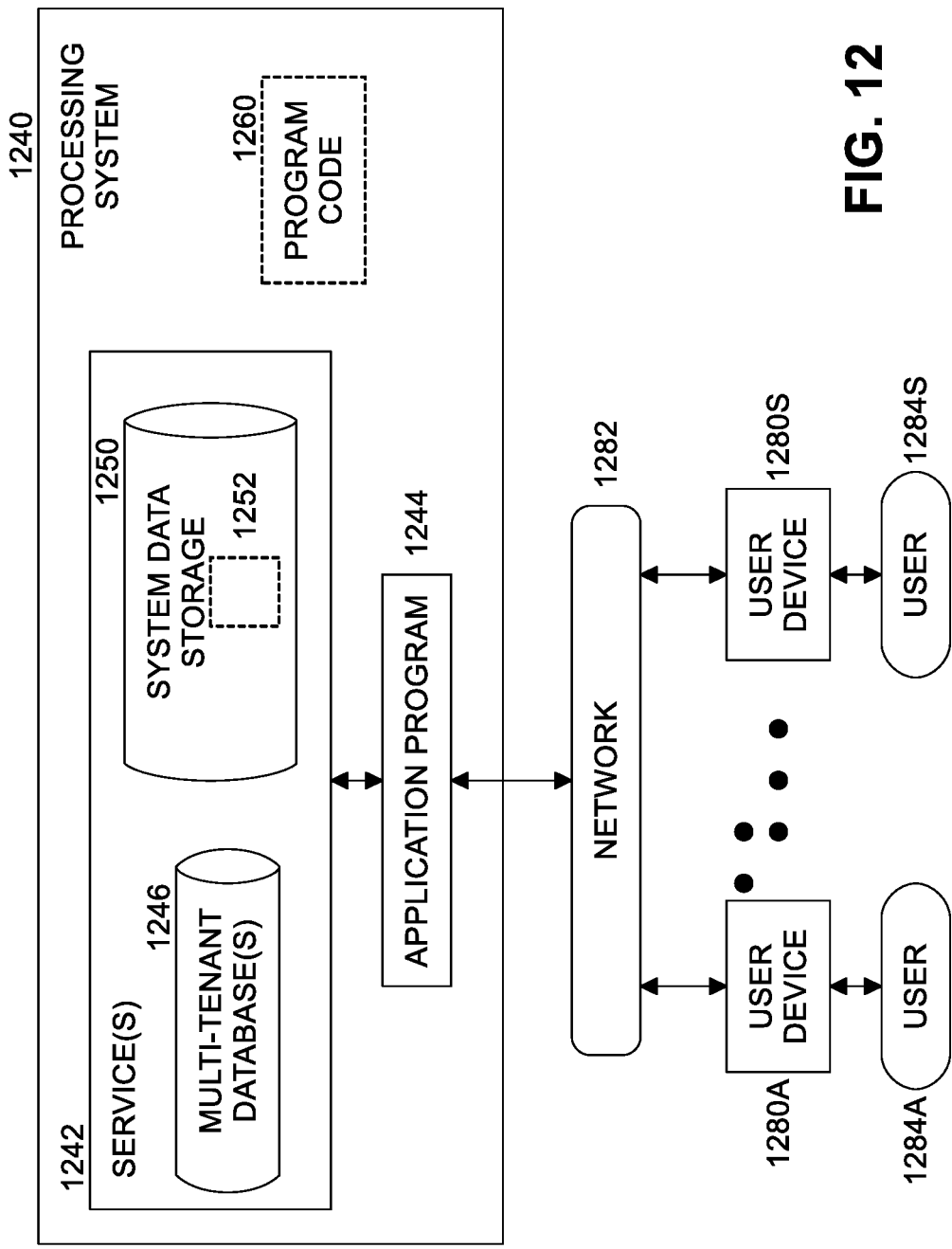
FIG. 12 is a block diagram of a cloud computing environment according to some example implementations.

Example Environment. FIG. 12 is a block diagram of a deployment environment according to some example implementations. A system 1240 includes hardware (e.g., a set of one or more server devices) and software to provide service(s) 1242, including the request modeler and distributor system 202. In some implementations, the system 1240 is in one or more datacenter(s). These datacenter(s) may be: 1) first party datacenter(s), which are datacenter(s) owned and/or operated by the same entity that provides and/or operates some or all of the software that provides the service(s) 1242; and/or 2) third-party datacenter(s), which are datacenter(s) owned and/or operated by one or more different entities than the entity that provides the service(s) 1242 (e.g., the different entities may host some or all of the software provided and/or operated by the entity that provides the service(s) 1242). For example, third-party datacenters may be owned and/or operated by entities providing public cloud services (e.g., Amazon.com, Inc. (Amazon Web Services), Google LLC (Google Cloud Platform), Microsoft Corporation (Azure)).

The system 1240 is coupled to user devices 1280A-1280S over a network 1282. The service(s) 1242 may be on-demand services that are made available to one or more of the users 1284A-1284S working for one or more entities other than the entity which owns and/or operates the on-demand services (those users sometimes referred to as outside users) so that those entities need not be concerned with building and/or maintaining a system, but instead may make use of the service(s) 1242 when needed (e.g., when needed by the users 1284A-1284S). The service(s) 1242 may communicate with each other and/or with one or more of the user devices 1280A-1280S via one or more APIs (e.g., a REST API). In some implementations, the user devices 1280A-1280S are operated by users 1284A-1284S, and each may be operated as a client device and/or a server device. In some implementations, one or more of the user devices 1280A-1280S are separate ones of the electronic device 1200 or include one or more features of the electronic device 1200. In some embodiments, service(s) 1242 includes request modeler and distributor system 202.

In some implementations, the system 1240 is a multi-tenant system (also known as a multi-tenant architecture). The term multi-tenant system refers to a system in which various elements of hardware and/or software of the system may be shared by one or more tenants. A multi-tenant system may be operated by a first entity (sometimes referred to a multi-tenant system provider, operator, or vendor; or simply a provider, operator, or vendor) that provides one or more services to the tenants (in which case the tenants are customers of the operator and sometimes referred to as operator customers). A tenant includes a group of users who share a common access with specific privileges. The tenants may be different entities (e.g., different companies, different departments/divisions of a company, and/or other types of entities), and some or all of these entities may be vendors that sell or otherwise provide products and/or services to their customers (sometimes referred to as tenant customers). A multi-tenant system may allow each tenant to input tenant specific data for user management, tenant-specific functionality, configuration, customizations, non-functional properties, associated applications, etc. A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all the vendors' data. As another example, in the context of Platform as a Service (PAAS), one set of tenants may be third-party application developers providing applications/services and another set of tenants may be customers of different ones or all the third-party application developers.

Multi-tenancy can be implemented in different ways. In some implementations, a multi-tenant architecture may include a single software instance (e.g., a single database instance) which is shared by multiple tenants; other implementations may include a single software instance (e.g., database instance) per tenant; yet other implementations may include a mixed model; e.g., a single software instance (e.g., an application instance) per tenant and another software instance (e.g., database instance) shared by multiple tenants.

In one implementation, the system 1240 is a multi-tenant cloud computing architecture supporting multiple services, such as one or more of the following types of services: schema inference and event validation processing, Customer relationship management (CRM); Configure, price, quote (CPQ); Business process modeling (BPM); Customer support; Marketing; External data connectivity; Productivity; Database-as-a-Service; Data-as-a-Service (DAAS or DaaS); Platform-as-a-service (PAAS or PaaS); Infrastructure-as-a-Service (IAAS or IaaS) (e.g., virtual machines, servers, and/or storage); Analytics; Community; Internet-of-Things (IoT); Industry-specific; Artificial intelligence (AI); Application marketplace ("app store"); Data modeling; Security; and Identity and access management (IAM).

For example, system 1240 may include an application platform 1244 that enables PAAS for creating, managing, and executing one or more applications developed by the provider of the application platform 1244, users accessing the system 1240 via one or more of user devices 1280A-1280S, or third-party application developers accessing the system 1240 via one or more of user devices 1280A-1280S.

In some implementations, one or more of the service(s) 1242 may use one or more multi-tenant databases 1246, as well as system data storage 1250 for system data 1252 accessible to system 1240. In certain implementations, the system 1240 includes a set of one or more servers that are running on server electronic devices and that are configured to handle requests for any authorized user associated with any tenant (there is no server affinity for a user and/or tenant to a specific server). The user devices 1280A-1280S communicate with the server(s) of system 1240 to request and update tenant-level data and system-level data hosted by system 1240, and in response the system 1240 (e.g., one or more servers in system 1240) automatically may generate one or more Structured Query Language (SQL) statements (e.g., one or more SQL queries) that are designed to access the desired information from the multi-tenant database(s) 1246 and/or system data storage 1250.

In some implementations, the service(s) 1242 are implemented using virtual applications dynamically created at run time responsive to queries from the user devices 1280A-1280S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 1260 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 1244 includes an application setup mechanism that supports application developers' creation and management of applications, which may be saved as metadata by save routines. Invocations to such applications, including the request modeler and distributor system 202, may be coded using Procedural Language/Structured Object Query Language (PL/SOQL) that provides a programming language style interface. Invocations to applications may be detected by one or more system processes, which manages retrieving application metadata for the tenant making the invocation and executing the metadata as an application in a software container (e.g., a virtual machine).

Network 1282 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, a $4^{th}$ generation wireless protocol (4G) (e.g., the Long Term Evolution (LTE) standard, LTE Advanced, LTE Advanced Pro), a fifth generation wireless protocol (5G), and/or similar wired and/or wireless protocols and may include one or more intermediary devices for routing data between the system 1240 and the user devices 1280A-1280S.

Each user device 1280A-1280S (such as a desktop personal computer, workstation, laptop, Personal Digital Assistant (PDA), smartphone, smartwatch, wearable device, augmented reality (AR) device, virtual reality (VR) device, etc.) typically includes one or more user interface devices, such as a keyboard, a mouse, a trackball, a touch pad, a touch screen, a pen or the like, video or touch free user interfaces, for interacting with a graphical user interface (GUI) provided on a display (e.g., a monitor screen, a liquid crystal display (LCD), a head-up display, a head-mounted display, etc.) in conjunction with pages, forms, applications and other information provided by system 1240. For example, the user interface device can be used to access data and applications hosted by system 1240, and to perform searches on stored data, and otherwise allow one or more of users 1284A-1284S to interact with various GUI pages that may be presented to the one or more of users 1284A-1284S. User devices 1280A-1280S might communicate with system 1240 using TCP/IP (Transfer Control Protocol and Internet Protocol) and, at a higher network level, use other networking protocols to communicate, such as Hypertext Transfer Protocol (HTTP), File Transfer Protocol (FTP), Andrew File System (AFS), Wireless Application Protocol (WAP), Network File System (NFS), an application program interface (API) based upon protocols such as Simple Object Access Protocol (SOAP), Representational State Transfer (REST), etc. In an example where HTTP is used, one or more user devices 1280A-1280S might include an HTTP client, commonly referred to as a "browser," for sending and receiving HTTP messages to and from server(s) of system 1240, thus allowing users 1284A-1284S of the user devices 1280A-1280S to access, process and view information, pages and applications available to it from system 1240 over network 1282.

Conclusion. In the above description, numerous specific details such as resource partitioning/sharing/duplication implementations, types and interrelationships of system components, and logic partitioning/integration choices are set forth in order to provide a more thorough understanding. The invention may be practiced without such specific details, however. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, and/or characteristic is described in connection with an implementation, one skilled in the art would know to affect such feature, structure, and/or characteristic in connection with other implementations whether or not explicitly described.

For example, the figure(s) illustrating flow diagrams sometimes refer to the figure(s) illustrating block diagrams, and vice versa. Whether or not explicitly described, the alternative implementations discussed with reference to the figure(s) illustrating block diagrams also apply to the implementations discussed with reference to the figure(s) illustrating flow diagrams, and vice versa. At the same time, the scope of this description includes implementations, other than those discussed with reference to the block diagrams, for performing the flow diagrams, and vice versa.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

The detailed description and claims may use the term "coupled," along with its derivatives. "Coupled" is used to indicate that two or more elements, which may or may not be in direct physical or electrical contact with each other, co-operate or interact with each other.

While the flow diagrams in the figures show a particular order of operations performed by certain implementations, such order is exemplary and not limiting (e.g., alternative implementations may perform the operations in a different order, combine certain operations, perform certain operations in parallel, overlap performance of certain operations such that they are partially in parallel, etc.).

While the above description includes several example implementations, the invention is not limited to the implementations described and can be practiced with modification and alteration within the spirit and scope of the appended claims. The description is thus illustrative instead of limiting.

In the detailed description, references are made to the accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described herein are not necessarily performed in the order indicated in some other implementations. Additionally, in some other implementations, the disclosed methods may include more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; that is, the phrase "A, B, or C" is intended to include the possibilities of "A," "B," "C," "A and B," "B and C," "A and C," and "A, B, and C."

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion.

In addition, the articles "a" and "an" as used herein and in the appended claims should generally be construed to mean "one or more" unless specified otherwise or clear from context to be directed to a singular form. Reference throughout this specification to "an implementation," "one implementation," "some implementations," or "certain implementations" indicates that a particular feature, structure, or characteristic described in connection with the implementation is included in at least one implementation. Thus, the appearances of the phrase "an implementation," "one implementation," "some implementations," or "certain implementations" in various locations throughout this specification are not necessarily all referring to the same implementation.

Some portions of the detailed description may be presented in terms of algorithms and symbolic representations of operations on data bits within a computer memory. These algorithmic descriptions and representations are the manner used by those skilled in the data processing arts to most effectively convey the substance of their work to others skilled in the art. An algorithm is herein, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, or otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving," "retrieving," "transmitting," "computing," "generating," "adding," "subtracting," "multiplying," "dividing," "optimizing," "calibrating," "detecting," "performing," "analyzing," "determining," "enabling," "identifying," "modifying," "transforming," "applying," "aggregating," "extracting," "registering," "querying," "populating," "hydrating," "updating," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission, or display devices.

It should also be understood that some of the disclosed implementations can be embodied in the form of various types of hardware, software, firmware, or combinations thereof, including in the form of control logic, and using such hardware or software in a modular or integrated manner. Other ways or methods are possible using hardware and a combination of hardware and software. Any of the software components or functions described in this application can be implemented as software code to be executed by one or more processors using any suitable computer language such as, for example, C, C++, Java™, or Python using, for example, existing or object-oriented techniques. The software code can be stored as non-transitory instructions on any type of tangible computer-readable storage medium (referred to herein as a "non-transitory computer-readable storage medium"). Examples of suitable media include random access memory (RAM), read-only memory (ROM), magnetic media such as a hard-drive or a floppy disk, or an optical medium such as a compact disc (CD) or digital versatile disc (DVD), flash memory, and the like, or any combination of such storage or transmission devices. Computer-readable media encoded with the software/program code may be packaged with a compatible device or provided separately from other devices (for example, via Internet download). Any such computer-readable medium may reside on or within a single computing device or an entire computer system and may be among other computer-readable media within a system or network. A computer system, or other computing device, may include a monitor, printer, or other suitable display for providing any of the results mentioned herein to a user.

In the foregoing description, numerous details are set forth. It will be apparent, however, to one of ordinary skill in the art having the benefit of this disclosure, that the present disclosure may be practiced without these specific details. While specific implementations have been described herein, it should be understood that they have been presented by way of example only, and not limitation. The breadth and scope of the present application should not be limited by any of the implementations described herein but should be defined only in accordance with the following and later-submitted claims and their equivalents. Indeed, other various implementations of and modifications to the present disclosure, in addition to those described herein, will be apparent to those of ordinary skill in the art from the foregoing description and accompanying drawings. Thus, such other implementations and modifications are intended to fall within the scope of the present disclosure.

Furthermore, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein, along with the full scope of equivalents to which such claims are entitled.

What is claimed is:

1. A computer-implemented method comprising:
   receiving a user request from a user computing system located in a first geographic region;
   generating a user request context for the user request, the generating of the user request context comprising determining a request type and generating a machine learning model for the request type and based on raw data included in the user request;
   selecting a cloud computing system assigned to a second geographic region having more computing resources currently available to process the user request than a cloud computing system assigned to the first geographic region based at least in part on the user request context and the machine learning model including current utilizations of computing resources of cloud computing systems assigned to the first and second geographic regions;
   sending the user request to the selected cloud computing system in the second geographic region;
   getting current utilizations of computing resources from cloud computing systems assigned to a plurality of regions;
   aggregating user request contexts and the current utilizations of computing resources; and
   updating the machine learning model with the aggregated user resource contexts and the aggregated current utilizations of computing resources of cloud computing systems.

2. The computer-implemented method of claim 1, further comprising generating a forecast of future user requests based at least in part on the aggregated user resource contexts and the aggregated current utilizations.

3. The computer-implemented method of claim 1, wherein generating the user request context comprises determining a request type for the user request, the request type comprising synchronous, asynchronous, and bulk, and further comprising creating a machine learning model for each request type.

4. The computer-implemented method of claim 3, comprising selecting the cloud computing system assigned to the second geographic region having a maximum amount of available computing resources when the request type is synchronous.

5. The computer-implemented method of claim 3, comprising selecting the cloud computing system assigned to the second geographic region having a minimum amount of available computing resources when the request type is asynchronous or bulk.

6. The computer-implemented method of claim 1, wherein generating the user request context comprises verifying user request validity based on one or more user request headers.

7. The computer-implemented method of claim 1, further comprising updating the user request context with a request response time of the selected cloud computing system completing handling of the user request.

8. An apparatus comprising:
   one or more processors configured to implement:
      a context generator to receive a user request from a user computing system located in a first geographic region and to generate a user request context for the user request, the generating of the user request context comprising determining a request type and generating a machine learning model for the request type and based on raw data included in the user request; and
      a user request distributor to select a cloud computing system assigned to a second geographic region having more computing resources currently available to process the user request than a cloud computing system assigned to the first geographic region based at least in part on the user request context and the machine learning model including current utilizations of computing resources of cloud computing systems assigned to the first and second geographic regions, and to send the user request to the selected cloud computing system in the second geographic region;
      a utilization updater to get current utilizations of computing resources from cloud computing systems assigned to a plurality of regions; and
      a model updater to aggregate user request contexts and the current utilizations of computing resources, and to update the machine learning model with the aggregated user resource contexts and the aggregated current utilizations of computing resources of cloud computing systems.

9. The apparatus of claim 8, wherein the one or more processors are further configured to implement:
   a forecast generator to generate a forecast of future user requests based at least in part on the aggregated user resource contexts and the aggregated current utilizations.

10. The apparatus of claim 8, wherein the context generator is to determine a request type for the user request, the request type comprising synchronous, asynchronous, and bulk, and further comprising creating a machine learning model for each request type.

11. The apparatus of claim 10, wherein the user request distributor is to select the cloud computing system assigned to the second geographic region having a maximum amount of available computing resources when the request type is synchronous.

12. The apparatus of claim 10, wherein the user request distributor is to select the cloud computing system assigned to the second geographic region having a minimum amount of available computing resources when the request type is asynchronous or bulk.

13. The apparatus of claim 8, wherein context generator is to verify that the user request is valid based on one or more user request headers.

14. A non-transitory machine-readable storage medium that provides instructions that, if executed by one or more processors, are configurable to cause the one or more processors to perform operations comprising:
 receiving a user request from a user computing system located in a first geographic region;
 generating a user request context for the user request, the generating of the user request context comprising determining a request type and generating a machine learning model for the request type and based on raw data included in the user request;
 selecting a cloud computing system assigned to a second geographic region having more computing resources currently available to process the user request than a cloud computing system assigned to the first geographic region based at least in part on the user request context and a machine learning model including current utilizations of computing resources of cloud computing systems assigned to the first and second geographic regions;
 sending the user request to the selected cloud computing system in the second geographic region;
 getting current utilizations of computing resources from cloud computing systems assigned to a plurality of regions;
 aggregating user request contexts and the current utilizations of computing resources; and
 updating the machine learning model with the aggregated user resource contexts and the aggregated current utilizations of computing resources of cloud computing systems.

15. The non-transitory machine-readable storage medium of claim 14, comprising instructions when executed to:
 generate a forecast of future user requests based at least in part on the aggregated user resource contexts and the aggregated current utilizations.

16. The non-transitory machine-readable storage medium of claim 14, comprising instructions when executed to:
 generate the user request context comprises determining a request type for the user request, the request type comprising synchronous, asynchronous, and bulk, and further comprising creating a machine learning model for each request type.

17. The non-transitory machine-readable storage medium of claim 16, comprising instructions when executed to:
 select the cloud computing system assigned to the second geographic region having a maximum amount of available computing resources when the request type is synchronous.

18. The non-transitory machine-readable storage medium of claim 16, comprising instructions when executed to:
 select the cloud computing system assigned to the second geographic region having a minimum amount of available computing resources when the request type is asynchronous or bulk.

19. The non-transitory machine-readable storage medium of claim 14, comprising instructions when executed to:
 verify that the user request is valid based on one or more user request headers.

20. The non-transitory machine-readable storage medium of claim 14, comprising instructions when executed to:
 update the user request context with a request response time of the selected cloud computing system completing handling of the user request.

* * * * *